United States Patent
Chen et al.

(10) Patent No.: US 12,254,220 B2
(45) Date of Patent: Mar. 18, 2025

(54) RESOURCE CONFIGURATION BASED ON ENERGY EXPENDITURE

(71) Applicant: Red Hat, Inc., Raleigh, NC (US)

(72) Inventors: Huamin Chen, Westboro, MA (US); Chen Wang, Chappaqua, NY (US); Dennis Keefe, Greenville, RI (US)

(73) Assignee: Red Hat, Inc., Raleigh, NC (US)

( * ) Notice: Subject to any disclaimer, the term of this patent is extended or adjusted under 35 U.S.C. 154(b) by 56 days.

(21) Appl. No.: 17/748,980

(22) Filed: May 19, 2022

(65) Prior Publication Data
US 2023/0376251 A1 Nov. 23, 2023

(51) Int. Cl.
*G06F 3/06* (2006.01)
*G06F 9/455* (2018.01)

(52) U.S. Cl.
CPC .......... *G06F 3/0665* (2013.01); *G06F 3/0641* (2013.01); *G06F 3/0679* (2013.01); *G06F 9/45558* (2013.01); *G06F 3/0604* (2013.01); *G06F 2009/45583* (2013.01)

(58) Field of Classification Search
CPC .... G06F 3/0665; G06F 3/0641; G06F 3/0679; G06F 9/45558; G06F 3/0604; G06F 2009/45583
USPC ................................................. 711/203, 202
See application file for complete search history.

(56) References Cited

U.S. PATENT DOCUMENTS

| | | | |
|---|---|---|---|
| 8,433,848 B1 * | 4/2013 | Naamad | G06F 3/0605 711/114 |
| 10,712,958 B2 | 7/2020 | Srinivasan et al. | |
| 10,878,353 B2 | 12/2020 | Masters | |
| 10,963,171 B2 | 3/2021 | Chen | |
| 2011/0238672 A1* | 9/2011 | Agarwala | H04L 67/1097 707/E17.014 |
| 2012/0151477 A1* | 6/2012 | Sinha | G06F 9/45558 718/1 |
| 2021/0042140 A1* | 2/2021 | Paul | G06F 1/3206 |
| 2021/0373973 A1 | 12/2021 | Ekins et al. | |
| 2022/0057947 A1 | 2/2022 | Sangle et al. | |
| 2022/0398019 A1* | 12/2022 | Fukazawa | G06F 3/0679 |

OTHER PUBLICATIONS

Beloglazov et al.: "Energy-Aware Resource Allocation Heuristics for Efficient Management of Data Centers for Cloud Computing", May 4, 2011, 14 pages.
Buyya et al.: "Energy-Efficient Management of Data Center Resources for Cloud Computing: A Vision, Architectural Elements, and Open Challenges", 12 pages.
Wang et al.: "Sustainability-aware Resource Provisioning in Data Centers", 2020, 10 pages.

* cited by examiner

*Primary Examiner* — Hosain T Alam
*Assistant Examiner* — Zubair Ahmed
(74) *Attorney, Agent, or Firm* — Womble Bond Dickinson (US) LLP (57) ABSTRACT

One or more parameters corresponding to a targeted energy characteristic of a computing client device are received. A ratio of types of storage devices allocated to the computing client device is adjusted based on the one or more parameters. A storage volume for the computing client device is provisioned according to the ratio of the types of the storage devices.

20 Claims, 5 Drawing Sheets

RESOURCE CONFIGURATION BASED ON ENERGY EXPENDITURE

TECHNICAL FIELD

Aspects of the present disclosure relate to provisioning clients in cloud environments and, more particularly, to providing storage volumes for cloud computing environments based on energy expenditure.

BACKGROUND

In computer systems, it may be advantageous to scale application deployments by using a cloud computing environment having cloud computing clients such as virtual machines and containers. The virtual machines and containers may be used for creating hosting environments for running application programs. Services for performing specific computing tasks may then be deployed on one or more of the cloud computing clients as necessary based on the computing requirements of the intended tasks. The use of cloud computing clients may allow a programmer to quickly scale the deployment of applications including services to the volume of traffic requesting the applications. Cloud computing clients may be deployed in a variety of hardware environments. There may be economies of scale in deploying hardware in a large scale and using virtualization and/or parallel processing provided by the cloud computing clients, for example, in a multi-tenant cloud, to increase a utilization of the physical hardware.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

DETAILED DESCRIPTION

In computer systems utilizing cloud computing clients, virtual machines and/or containers may be used as the cloud computing client device. In an example, a virtual machine ("VM") may be a robust simulation of an actual physical computer system utilizing a hypervisor to allocate physical resources to the VM. In some examples, container based virtualization system such as Red Hat® OpenShift® or Docker® may be advantageous, as container based virtualization systems may be lighter weight than typical systems using virtual machines with hypervisors. In the case of containers, a container may be hosted on a physical host or virtual machine that already has an operating system executing, and the container may be hosted on the operating system of the physical host or VM. To operate, these cloud computing clients may have system resources allocated to them, for example, central processing unit "CPU" or "processor" (cores or shares), Graphics Processing Unit "GPU" (cores or slices), memory (size and I/O rates), persistent storage (size and I/O rates), network bandwidth, IP addresses, network routes, etc.

Many cloud computing infrastructures are aiming for carbon neutrality in the next decade. Efforts have been made into renewable energy investment in data centers. On the demand side, there are more opportunities to reduce a carbon footprint of the data center by using resources in an energy efficient way. In some cases, investment in these areas is replacing high-performance, high-power devices with more energy-efficient media (e.g., between hard disk drives (HDD) and solid state drives (SSD)) or circuits (e.g., from x86 to ARM architecture). However, these new technologies are often at the expense of different performance profiles or less reliability.

As appreciated by the inventors, SSD media may consume more (e.g., twice as much) energy as HDD media for the same amount of storage in certain configurations (see, e.g., www.cloudcarbonfootprint.org/docs/methodology/#storage). As a result, a similarly configured storage volume using SSD may produce higher carbon per usage than an HDD. Similarly, CPUs and memory may also have different energy consumption profiles. When allocating CPU and memory resources to perform certain data services on storage volumes, care has to be taken to balance energy, performance, and cost. For example, by selecting for a higher performance operation (e.g., SSD media) for a given cloud computing client, the resulting configuration may have an unacceptable carbon footprint due to excessive energy usage. Similarly, attempting to reduce the amount of media used, such as through deduplication and/or compression, may increase an amount of processing power and/or memory utilized to provide the services performing the deduplication and/or compression.

The present disclosure addresses the above-noted and other deficiencies by providing an improved provisioning component for cloud computing clients. The improved provisioning component may take input information, such as energy, performance, cost, capacity, location, and reliability, and may provision a plurality of storage volumes with different storage media types (e.g., non-volatile memory express (NVMe), SSD, HDD), using an optimization algorithm and/or analysis to attempt to attain all the goals of the input information. In some embodiments, weights may be assigned to each of the elements of the input information to prioritize one element over another in the event the elements of the input information are conflicting.

In some cases, the input information and/or associated weights can be further grouped into different profiles so that users with different goals can choose their preferred profile and thus the provisioning strategy. For instance, a green energy user may give higher weight to energy over performance.

The provisioning component may also take the same input information and provision the cloud computing client with an improved configuration for CPU and/or memory that satisfies the energy and performance requirements provided by the input information. This improved CPU/memory configuration, among other things, may consider data services, including compression/deduplication/encryption, to be performed on the storage volume. These services may utilize additional CPU/memory resources. For example, for the same amount of data services, different CPU and memory allocation profiles yield different energy consumption and performance results. Thus, this improved provisioning component may allocate the memory and CPU resources to the cloud computing client to achieve the chosen goals of the user and/or administrator.

Embodiments of the present disclosure may provide a technological solution that reduces the power consumption of a cloud computing solution while achieving performance goals of the user and/or administrator. By modifying an allocation of resources, both physical and virtual, to the cloud computing client, embodiments of the present disclosure may efficiently mix types of storage to reduce an overall power consumption, when requested, in a way that is transparent to the user and easier to administer.

Figure 1:
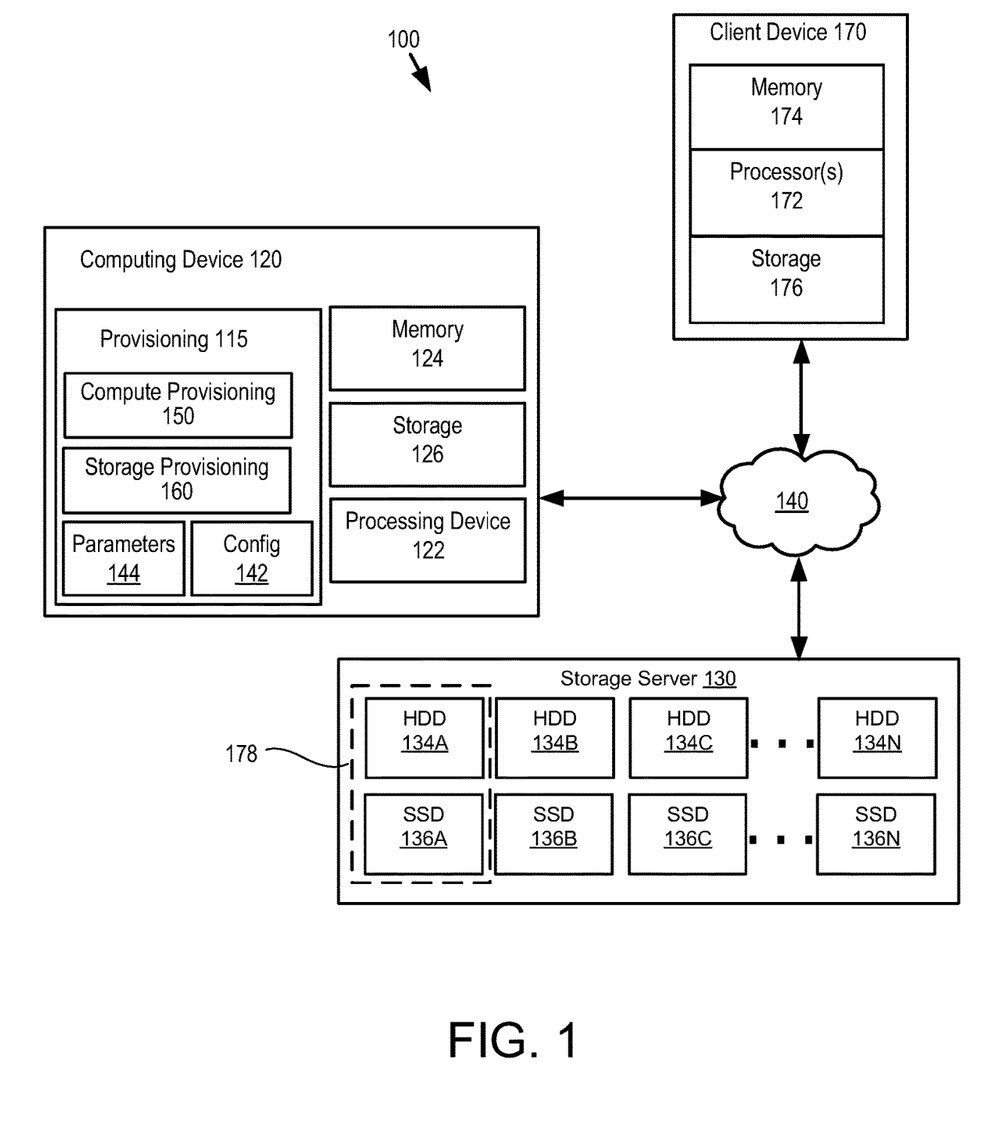
FIG. 1 is a block diagram that illustrates an example system, according to some embodiments of the present disclosure.

FIG. 1 is a block diagram that illustrates an example system 100, according to some embodiments of the present disclosure. FIG. 1 and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

As illustrated in FIG. 1, the system 100 includes a computing device 120 (also referred to herein as host device 120 and host computing device 120), a storage server 130, a cloud computing client device 170 (also referred to as a computing client device 170) and a network 140. The computing device 120, the cloud computing client device 170, and the storage server 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WIFI™ hotspot connected with the network 140 and/or a wireless carrier system that can be implemented using various data processing equipment, communication towers (e.g. cell towers), etc. The network 140 may carry communications (e.g., data, message, packets, frames, etc.) between computing device 120, the cloud computing client device 170, and storage server 130.

The computing device 120 (and storage server 130) may include hardware such as processing device 122 (e.g., processors, central processing units (CPUs)), memory 124 (e.g., random access memory (RAM)), storage devices 126 (e.g., hard-disk drive (HDD), solid-state drives (SSD), etc.), and other hardware devices (e.g., sound card, video card, etc.). It should be noted that although, for simplicity, a single processing device 122 is depicted in the computing device 120 depicted in FIG. 1, other embodiments of the computing device 120 may include multiple processing devices 122, memory 124, storage devices 126, and/or other devices.

Processing device 122 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 122 may also include one or more special-purpose processing devices such as an application specific integrated circuit (ASIC), a field programmable gate array (FPGA), a digital signal processor (DSP), network processor, or the like.

Memory 124 may include volatile memory devices (e.g., random access memory (RAM)), non-volatile memory devices (e.g., flash memory) and/or other types of memory devices. In certain implementations, memory 124 may be non-uniform access (NUMA), such that memory access time depends on the memory location relative to processing device 122.

A storage device 126 may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

The computing device 120 and storage server 130 may comprise any suitable type of computing device or machine that has a programmable processor including, for example, server computers, desktop computers, laptop computers, tablet computers, smartphones, set-top boxes, etc. In some examples, the computing device 120 and storage server 130 may comprise a single machine or may include multiple interconnected machines (e.g., multiple servers configured in a cluster). The computing device 120 and storage server 130 may be implemented by a common entity/organization or may be implemented by different entities/organizations. For example, computing device 120 may be operated by a first company/corporation and the storage server 130 may be operated by a second company/corporation. The computing device 120 and storage server 130 may each execute or include an operating system (OS), as discussed in more detail below. The operating systems of computing device 120 and storage server 130 may manage the execution of other components (e.g., software, applications, etc.) and/or may manage access to the hardware (e.g., processors, memory, storage devices etc.) of the computing device 120.

The storage server 130 may be a server which may contain storage devices (e.g., HDDs 134 and SSDs 136). Storage server 130 may be accessible by the computing device 120 and/or the cloud computing client device 170 over the network 140. For example, the storage server 130 may provide a plurality of HDDs 134A to 134N and a plurality of SSDs 136A to 136N to be connected to one or more cloud computing client devices 170. The number of HDDs 134 and SSDs 136 illustrated in FIG. 1 are merely an example and are not intended to limit the embodiments of the present disclosure.

As will be described further herein, one or more of the HDDs 134 and one or more of the SSDs 136 may be combined to form a storage volume 178. The storage volume 178 may be virtual storage volume (e.g., a pool of storage space) in which multiple storage devices (e.g., HDDs 134 and SSDs 136) are mapped together into a contiguous logical volume across one or more physical storage disks. The storage volume 178 may be provided to the cloud computing client device 170 as a storage device (e.g., storage device 176). In some embodiments, different types of storage devices of the storage server 130 may be combined into the storage volume 178. For example, one type of storage device may be the HDD 134 and another type of the storage device may be the SSD 136. Though only SSDs 136 and HDDs 134 are illustrated in FIG. 1, the embodiments of the present disclosure are not limited to these types of storage device. Other types of storage devices, such as NVMe storage devices, may be supported without deviating from the embodiments of the present disclosure.

The computing device 120 may execute a provisioning component 115. The provisioning component 115 may be configured to provision the cloud computing client device 170. The computing device 120 may assign resources, such as memory 174, processor(s) 172, and storage 176 to the cloud computing client device 170. In some embodiments, the cloud computing client device 170 may be a VM or a container executing on host computing device 120.

Figure 2A:
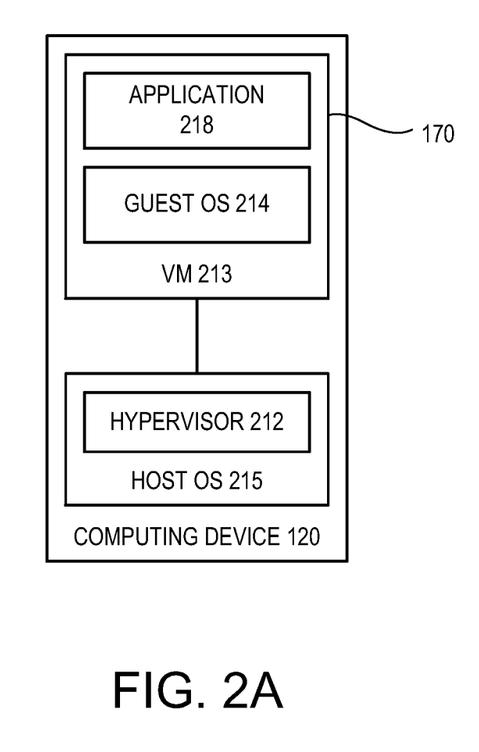
FIG. 2A is a block diagram that illustrates an example cloud computing client device executing as a virtual machine, in accordance with some embodiments of the present disclosure.
Figure 2B:
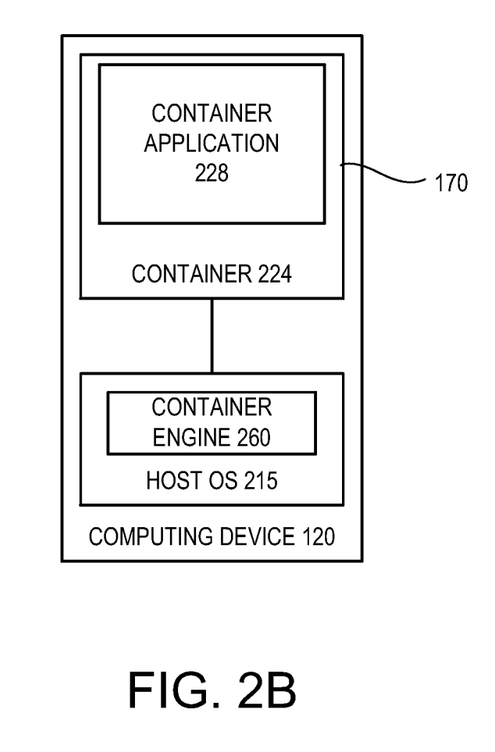
FIG. 2B is a block diagram that illustrates an example cloud computing client device executing as a container, in accordance with some embodiments of the present disclosure.

FIG. 2A is a block diagram that illustrates an example cloud computing client device 170 executing as a virtual machine, in accordance with some embodiments of the present disclosure. FIG. 2B is a block diagram that illustrates an example cloud computing client device 170 executing as a container, in accordance with some embodiments of the present disclosure. FIGS. 2A and 2B contrast the use of a virtual machine with the use of a container, such as for the cloud computing client device 170.

Referring to FIG. 2A, in a VM-based infrastructure, a computing device 120 may include hardware (e.g., processing devices, memory, storage devices, other devices, etc.) and a host operating system (OS) 215. As discussed above, one type of a virtual environment may be a virtual machine (VM) 213 executing on the host computing device 120. In one embodiment, the VM 213 may be a software implementation of a machine (e.g., a software implementation of a computing device) that includes its own operating system (referred to as guest OS 214), including its own kernel, and executes application programs, applications, software. VM 213 may be, for example, a hardware emulation, a full virtualization, a para-virtualization, and an operating system-level virtualization VM.

Computing device 120 may include a hypervisor 212, which may also be known as a virtual machine monitor (VMM). In the example shown, hypervisor 212 may be a component of a host operating system 215. In another example, hypervisor 212 may run on top of a host operating system 215, or may run directly on host hardware without the use of a host operating system 215. Hypervisor 212 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 212, though typically implemented in software, may emulate and export a bare machine interface to higher level software in the form of virtual processors and guest memory. Higher level software may comprise a standard or real-time operating system (OS), may be a highly stripped down operating environment with limited operating system functionality, may not include traditional OS facilities, etc. Hypervisor 212 may present other software (i.e., "guest" software) the abstraction of one or more virtual machines (VMs) that provide the same or different abstractions to various guest software (e.g., guest operating system, guest applications).

VM 213 may execute guest software that uses an underlying emulation of the physical resources (e.g., virtual processors and guest memory). As illustrated in FIG. 2A, VM 213 may execute an application 218 within a runtime environment (not shown in the figures). The VM 213 and/or the application 218 may form a cloud computing client device 170 such as that illustrated in FIG. 1. In some embodiments, the host computing device 120 may provision the cloud computing client device 170 by exposing resources such as a real or emulated processor(s) 172, real or emulated memory 174, and/or real or emulated storage 176 (see FIG. 1) by way of the hypervisor 212.

Referring to FIG. 2B, in a container-based infrastructure, a computing device 120 may include hardware (e.g., processing devices, memory, storage devices, other devices, etc.) and a host OS 215. A container 224 make execute as part of the host OS 215 on the host computing device 120. In one embodiment, the container 224 may be an isolated set of resources allocated to executing a container application 228 and may be process independent from other applications, software, and/or processes. The host OS 215 may use namespaces to isolate the resources of the containers 224 from each other. In another embodiment, the container 224 may be a virtualized object similar to virtual machines. However, container 224 may not implement separate guest OS (like the guest OS kernel 214 of the VM 213 illustrated in FIG. 2A). The container 224 may share the kernel, libraries, and binaries of the host OS 215 with other containers 224 that are executing on the computing device 120. Although FIG. 2B illustrates one container 224, the computing device 120 may include multiple containers 224 in other embodiments.

In one embodiment, a container engine 260 may allow different containers 224 to share the host OS 215 (e.g., the OS kernel, binaries, libraries, etc.) of the computing device 120. For example, the container engine 260 may multiplex the binaries and/or libraries of the host OS 215 between multiple containers 224. The container engine 260 may also facilitate interactions between the container 224 and the resources of the computing device 120. For example, the container engine 260 may manage requests from container 224 to access a memory (e.g., a RAM) of the computing device 120. In another example, the container engine 260 may manage requests from the container 224 to access certain libraries/binaries of the host OS 215. In other embodiments, the container engine 260 may also be used to create, remove, and manage containers 224. In one embodiment, the container engine 260 may be a component of the host operating system 215 (e.g., Red Hat™ Enterprise Linux). In another embodiment, container engine 260 may run on top of a host operating system 215, or may run directly on host hardware without the use of a host operating system 215.

The container 224 and/or the container application 228 may form a cloud computing client device 170 such as that illustrated in FIG. 1. In some embodiments, the host computing device 120 may provision the cloud computing client device 170 by configuring resources to be provided to the container 224, such as a real or emulated processor(s) 172, real or emulated memory 174, and/or real or emulated storage 176 (see FIG. 1) by way of the container engine 260.

FIGS. 2A and 2B illustrate some of the differences between a VM-based solution for a cloud computing client device 170 (FIG. 2A) and a container-based solution for a cloud computing client device 170 (FIG. 2B). In a VM-based solution, an entire virtual system, including a OS kernel and operating system (e.g., guest OS kernel 214) are utilized to execute an application 218 on the cloud computing client device 170. While this can allow for a wide range of support, it may increase the overhead to execute the application 218. In contrast, in a container-based solution for the cloud computing client device 170, the container application 228 executes from a same host OS 215, eliminating the need for a full guest OS installation.

Referring back to FIG. 1, the provisioning component 115 may include a compute provisioning engine 150 and a storage provisioning engine 160. The compute provisioning engine 150 and/or the storage provisioning engine 160 may include, for example, executable instructions configured to be executed on processing device 122 to provision the cloud computing client device 170 (e.g., by providing memory 174, processor(s) 172, and/or storage 176 to the a VM or a container, as illustrated in FIGS. 2A and 2B). Though the compute provisioning engine 150 and the storage provisioning engine 160 are illustrated as separate components in FIG. 1, this is for convenience of description only. In some embodiments, both the compute provisioning engine 150 and the storage provisioning engine 160 may be a single module or executable circuit.

The compute provisioning engine 150 may be configured to provision a compute capability of the cloud computing client device 170. For example, the compute provisioning engine 150 may be configured to provide memory 174 and/or processor(s) 172 to the cloud computing client device 170. In some embodiments, either the memory 174 and/or the processor(s) 172 may be real or virtualized components provided to the cloud computing client device 170 for execution and/or operation of the cloud computing client device 170.

The storage provisioning engine 160 may be configured to provision a storage capability of the cloud computing client device 170. For example, the storage provisioning engine 160 may be configured to provide storage 176 to the cloud computing client device 170. In some embodiments, the storage 176 may be provided by the storage volume 178 of the storage server 130. In some embodiments, the storage provisioning engine 160 may communicate with the storage server 130 (e.g., over network 140) to combine one or more of the HDDs 134, the SSDs 136, and/or other storage device types (e.g., NVMe storage devices) to form the storage volume 178.

In some embodiments, in order to provision the cloud computing client device 170, the provisioning component 115 may generate configuration file 142. The configuration file 142 may control a configuration of the cloud computing client device 170. For example, the configuration file 142 may control the operations of the compute provisioning engine 150 and the storage provisioning engine 160 to configure the cloud computing client device 170. In other words, the compute provisioning engine 150 may configure the memory 174 and/or processor(s) 172 of the cloud computing client device 170 based on the configuration file 142. Similarly, the storage provisioning engine 160 may configure the storage 176 of the cloud computing client device 170 and/or the storage volume 178 of the storage server 130 based on configuration file 142.

In some embodiments, the configuration file 142 may be based on parameters 144 received by the host computing device 120. In some embodiments, the parameters 144 may be provided that correspond to one or more targeted energy characteristics of the cloud computing client device 170. Based on the parameters 144, the host computing device 120 may generate the configuration file 142 associated with the cloud computing client device 170 to meet or exceed the targeted energy characteristics that correspond to the provided parameters 144. More detail with respect to the parameters 144 and the configuration file 142 will be provided with respect to FIG. 3.

Although FIG. 1 illustrates only a single computing device 120 for ease of illustration and description, computing device 120 may be just one deployment among many within an overarching cloud or on-premises infrastructure that system 100 represents. For example, additional computing devices may be included within system 100 that act as additional deployments.

Figure 3:
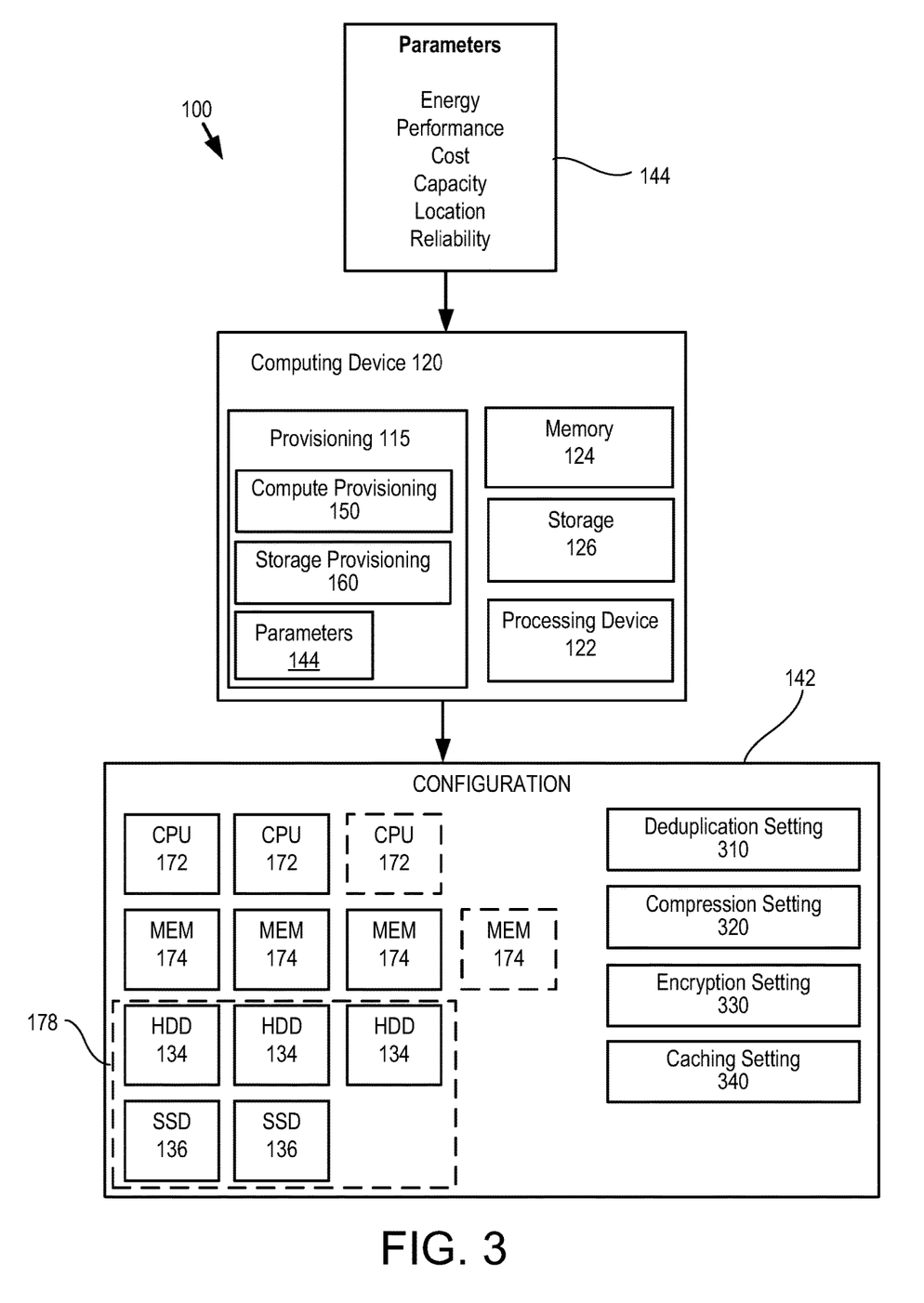
FIG. 3 is a schematic diagram of system that provides additional details regarding the generation of a configuration file for a cloud computing client device, according to some embodiments of the present disclosure.

FIG. 3 is a schematic diagram of system 100 that provides additional details regarding the generation of a configuration file 142 by a host computing device 120 for a cloud computing client device 170, according to some embodiments of the present disclosure. A descriptions of elements of FIG. 3 that have been described with respect to previous figures will be omitted for brevity.

Referring to FIG. 3, the computing device 120 may generate a configuration file 142 from parameters 144. As discussed with respect to FIG. 1, the configuration file 142 may be used by the computing device 120 to provision and/or execute the cloud computing client device 170.

The parameters 144 may correspond to one or more targeted energy characteristics of a cloud computing client device 170. In some embodiments, the parameters 144 may be provided by a user and/or administrator of the cloud computing client device 170. In some embodiments, the parameters 144 may be and/or include one or more of an energy parameter, a performance parameter, a cost parameter, a capacity parameter, a location parameter, and/or a reliability parameter. The parameters 144 may be used by the host computing device 120 as input to determine (e.g., by the provisioning component 115) the configuration of one or more aspects of the cloud computing client device 170.

The energy parameter may indicate a preferred energy level and/or carbon footprint of the cloud computing client device 170. In some embodiments, the energy parameter may be provided in relative terms. For example, the energy parameter may be specified as "low energy consumption," "medium energy consumption," or "high energy consumption." In some embodiments, the energy parameter may specify a maximum wattage or carbon footprint that the resulting cloud computing client device 170 is not to exceed. The energy parameter may be used as a guide by the cloud computing client device 170 (e.g., the provisioning component 115) to select particular configuration elements for the configuration file 142, as will be discussed further herein.

The performance parameter may indicate a preferred level of performance of the cloud computing client device 170. In some embodiments, the performance parameter may be provided in relative terms, such as "low performance," "medium performance," or "high performance." A "high performance" cloud computing client device 170 may be configured by the provisioning component 115 to have more and/or faster execution resources (e.g., more processor(s) 172 and/or memory 174, faster storage 176, etc.) than a "low performance" or "medium performance" cloud computing client device 170.

The cost parameter may indicate a maximum cost of the resulting cloud computing client device 170. The provisioning component 115 may utilize the cost parameter to limit and/or control the configuration of the cloud computing client device 170. For example, provisioning the cloud computing client device 170 with a higher number of processor(s) 172 and/or memory 174 may result in a higher cost. The cost parameter may be used to provide an upper limit, for example, to the resulting configuration of the configuration file 142. In some embodiments, the cost parameter may be an absolute value or a relative value, such as "low cost" or "medium cost."

The capacity parameter may indicate a preferred capacity of the processors(s) 172 and/or memory 174 of the resulting cloud computing client device 170. For example, the capacity parameter may indicate a number of processor(s) and/or cores 172 to allocate to the cloud computing client device 170. Similarly, the capacity parameter may indicate an amount of memory to allocate to the cloud computing client device 170.

The location parameter may indicate a preferred location of the resulting resources used to configure the cloud computing client device 170. For example, in some embodiments, resources at a particular physical location may be more or less expensive than resources at a second physical location. The location parameter may indicate a preference for assignment of resources (e.g., storage 176) for the cloud computing client device 170.

The reliability parameter may indicate a preferred reliability of the cloud computing client device 170. For example, the reliability parameter may specify a particular guaranteed up-time or other service-level agreement. The reliability parameter may be used by the provisioning component 115 to select particular resources for the resulting cloud computing client device 170 that meet or exceed the reliability parameter (e.g., to meet a specified service level agreement).

The parameters of FIG. 3 are merely an example and are not intended to limit the embodiments of the present disclosure. More, fewer, or different parameters 144 than those illustrated in FIG. 3 may be utilized without deviating from the embodiments of the present disclosure.

The provisioning component 115 may utilize the parameters 144 to generate the configuration file 142, which may be used to create the cloud computing client device 170. For example, the provisioning component 115 may analyze the parameters 144 to determine a configuration of a cloud computing client device 170 that meets the specified parameters 144. In some embodiments, the parameters 144 may be weighted so as to assist in determining the configuration 142 in the event of conflicting parameters 144. For example, a high performance cloud computing client device 170 is typically more expensive. If a set of parameters 144 were to select a high performance and low cost configuration for a cloud computing client device 170, it might be difficult to achieve a configuration for the cloud computing client device 170 that met both parameters 144. In such an instance, the provisioning component may utilize the weights of the parameters 144 to determine the resulting configuration 142. For example, if the performance parameter is rated higher than the cost parameter, the provisioning component 115 may prioritize the configuration 142 so as to provide a higher performing cloud computing client device 170 at a higher cost.

By utilizing the parameters 144, the provisioning component 115 may determine a targeted energy characteristic of the cloud computing client device 170. The targeted energy characteristic may be used to provision the cloud computing client device 170 so as to meet the parameters 144.

For example, based on the parameters 144, the storage provisioning engine 160 may determine a ratio of device types of the storage server 130 that are to be configured (e.g., specified within the configuration file 142) for the cloud computing client device 170. In some embodiments, the storage provisioning engine 160 may generate a storage volume 178 from a mix of device types of the storage server 130. For example, the storage volume 178 may have one or more storage devices of a first type (e.g., HDDs 134) and one or more storage devices of a second type, different from the first type (e.g., SSDs 136). In some embodiments, the storage volume 178 may be provided to the cloud computing client device 170 as storage 176 (see FIG. 1). For example, the storage volume 178 of the storage server 130 may be remotely mounted (e.g., over network 140) to cloud computing client device 170. In some embodiments, the cloud computing client device 170 may be unaware of the mix of device types of the storage devices. In other words, the different device types of the storage volume 178, as well as the ratio of the device types of the storage volume 178, may be transparent to the cloud computing client device 170.

As previously noted, SSD devices 136, while higher performing, may also have a larger carbon footprint as compared to HDD devices 134. For parameters 144 which specify a lower energy consumption, the storage provisioning engine 160 may specify a higher ratio of HDDs 134 to SSDs 136 within the storage volume 178. Similarly, parameters 144 which specify a higher performance with less regard to energy consumption may specify a higher ratio of SSDs 136 to HDDs 134 within the storage volume 178. In FIG. 3, the storage volume 178 is illustrated as having three HDDs 134 and two SSDs 136, but this is merely an example and is not intended to limit the embodiments of the present disclosure.

In this way, the configuration file 142 may be created based on the parameters 144 without requiring that a user and/or administrator specifically allocate the devices. Instead, the user and/or administrator may instead express their preferences in terms of the performance, cost, and/or energy consumption of the resulting cloud computing client device 170, and the configuration 142 of the cloud computing client device 170 may be generated automatically.

In addition to the ratios and/or types of the storage devices, settings associated with the storage volume 178 may also be set with respect to the parameters 144. For example, deduplication settings 310, compression settings 320, encryption settings 330, and/or caching settings 340 may be automatically set in response to the parameters 144.

As an example, the deduplication settings may indicate that deduplication is to be performed on the storage volume 178. In some embodiments, this may reduce the size of the storage volume 178 and/or the number of devices of the storage volume 178, but may have a penalty of additional processing and/or memory usage.

The compression settings may indicate that compression is to be performed on the data of the storage volume 178. In some embodiments, this may also reduce the size of the storage volume 178 and/or the number of devices of the storage volume 178, but may have a penalty of additional processing and/or memory usage.

The encryption settings may indicate that encryption is to be performed on the data of the storage volume 178. In some embodiments, this may increase the security of the data of the storage volume 178 at the expense of additional processing and/or memory usage.

The caching settings may indicate that caching is to be performed on accesses of the data of the storage volume 178. In some embodiments, this may increase the performance of accesses made to the data of the storage volume 178 at the expense of additional storage requirements of the storage volume as well as potentially additional energy expenditure due to additional processing and/or memory usage.

The provisioning component 115 may analyze the parameters 144 and make changes to the deduplication settings 310, compression settings 320, encryption settings 330, and/or caching settings 340 to meet the requested parameters 144. For example, one or more of the deduplication settings 310, compression settings 320, encryption settings 330, and/or caching settings 340 may be modified with respect to the storage volume 178 based on the one or more parameters 144. For example, if the parameters 144 indicate that a resulting cloud computing client device 170 is to have a lower energy expenditure and/or carbon footprint, the deduplication settings 310 may be set to indicate deduplication is to be provided for the storage volume 178, and the compression setting 320 may be set to indicate compression is to be provided for the storage volume 178, so as to reduce the number of HDDs 134 and/or SSDs 136 used as part of the storage volume 178.

Based on the settings of the storage volume 178 and/or the deduplication settings 310, compression settings 320, encryption settings 330, and/or caching settings 340, additional changes may be made to the configuration file 142. For example, in response to the settings, the compute provisioning engine 150 may make further modifications to processor(s) 172 and/or memory 174 of the cloud computing client device 170 configured by the configuration file 142. For example, the compute provisioning engine 150 may provision the cloud computing client device 170 to have additional memory 174 and/or processor(s) 172 beyond that initially set for the cloud computing client device 170 (e.g., by a user and/or administrator, or by the capacity parameter of the parameters 144). In some embodiments, the compute provisioning engine 150 may determine a first quantity of memory 174 and/or processor(s) 172 based on the requirements of an application to be executed on the cloud computing client device 170 or as specified in the parameters 144 (e.g., as a capacity parameter). The compute provisioning engine 150 may further increase (or decrease) the quantity of memory 174 and/or processor(s) 172 based on the data services indicated by the deduplication settings 310, compression settings 320, encryption settings 330, and/or caching settings 340.

In the example, of FIG. 3, which is merely for illustration purposes, two processor(s) 172 and three elements of memory 174 are initially provisioned by the compute provisioning engine 150. For example, the initial provisioning may be in response to a configuration specified by the user and/or administrator of the cloud computing client device 170. In response to the parameters 144 and/or the deduplication settings 310, compression settings 320, encryption settings 330, and/or caching settings 340 of the storage volume 178, an additional processor 172 and an additional amount of memory 174 (illustrated by dashed lines in FIG. 3) may be added. In some embodiments, the processor(s) 172 and/or memory 174 may be added to meet the parameters 144. For example, if deduplication is set by the deduplication setting 310, additional processor 172 and memory 174 capacity may be added to the cloud computing client device 170 to perform the deduplication without negatively impacting the performance of the cloud computing client device 170.

As illustrated in FIG. 3, the parameters 144 may be analyzed by the provisioning component 115 to determine a relative preference for an energy expenditure and/or carbon footprint to be met by the resulting cloud computing client device 170. The provisioning component 115 (e.g., by way of the storage provisioning engine 160 and/or the compute provisioning engine 150) may be used to generate a configuration file 142 that specifies a storage volume 178 having a determined ratio of storage device types that meeting the specifications of the parameters 144. For example, more HDDs 134 (vs. SSDs 136) may be provided as part of the storage volume 178 responsive to parameters 144 that indicate a lower energy expenditure or carbon footprint.

The settings for the storage volume 178 (e.g., the deduplication settings 310, compression settings 320, encryption settings 330, and/or caching settings 340) may be further utilized to adjust the energy expenditure and/or carbon footprint of the cloud computing client device 170. Changes to the settings of the storage volume 178 may result in further adjustments to the components of the cloud computing client device 170 (e.g., the memory 174 and/or processor(s) 172) that are further adjusted in light of the provided parameters 144. In this way, the provisioning component 115 may generate a configuration file 142 that results in a cloud computing client device 170 that best meets the parameters 144 provided by the user and/or administrator of the cloud computing client device 170.

Though FIG. 3 illustrates a list of individual parameters 144, the embodiments of the present disclosure are not limited to such a configuration. In some embodiments, the parameters 144 may be grouped in particular profiles that may be selected by a user and/or administrator. For example, a "low carbon footprint" profile may be provided that combines a number of the settings (e.g., the deduplication settings 310, compression settings 320, encryption settings 330, and/or caching settings 340) to generate parameters 144 that generally favor lower expenditure of power (e.g., a higher ratio of HDDs 134). As another example, a "high performance" profile may be provided that combines a number of the settings (e.g., the deduplication settings 310, compression settings 320, encryption settings 330, and/or caching settings 340) to generate parameters 144 that generally favor higher performance as compared to a lower expenditure of power (e.g., a higher ratio of SSDs 136). It will be understood that other profile types could be provided within the scope of the present disclosure.

The configuration file 142 may be used to launch and/or administer the cloud computing client device 170. In some embodiments, the storage volume 178 managed and/or created by the configuration file 142 may be managed atomically with the cloud computing client device 170. For example, the storage volume 178 may be created, migrated, backed up, and/or destroyed atomically with the cloud computing client device 170. In some embodiments, a user and/or administrator may be able to change the parameters 144 associated with a given cloud computing client device 170. In some embodiments, changing the parameters 144 may result in the configuration of the cloud computing client device 170 being automatically reconfigured. In some embodiments, changing the parameters 144 may result in the configuration of the cloud computing client device 170 being changed, and the cloud computing client device 170 being migrated to the new configuration. In some embodiments, if the new configuration results in a different configuration of the storage volume 178 (e.g., a different ratio of storage device types), the data from the previous storage volume 178 may be migrated to the new storage volume 178 having the updated ratio of storage device types.

Figure 4:
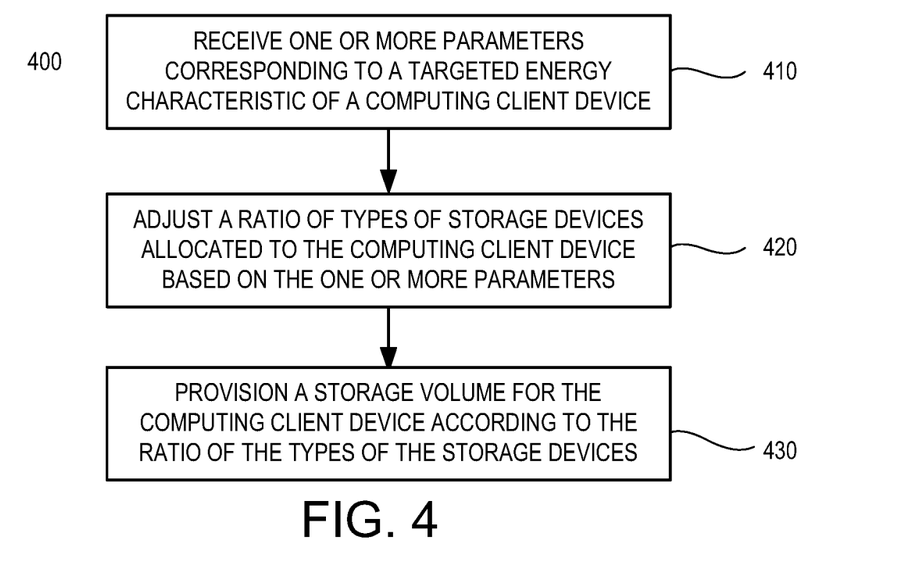
FIG. 4 is a flow diagram of a method for provisioning a cloud computing client device, in accordance with some embodiments of the present disclosure

FIG. 4 is a flow diagram of a method 400 for provisioning a cloud computing client device 170, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., computing device 120 illustrated in FIGS. 1 and 3).

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Referring simultaneously to FIGS. 1 and 3 as well, the method 400 begins at block 410, in which one or more parameters 144 corresponding to a targeted energy characteristic of a computing client device 170 are received. In some embodiments, the one or more of the parameters 144 comprise an energy characteristic, a performance characteristic, a cost characteristic, a capacity characteristic, a location characteristic, or a reliability characteristic. In some embodiments, the computing client device 170 comprises a software container or a virtual machine.

At block 420, a ratio of types of storage devices allocated to the computing client device 170 are adjusted based on the one or more parameters 144. In some embodiments, the types of the storage devices comprise HDDs, SSDs, and/or NVMe drives.

At block 430, a storage volume 178 for the computing client device 170 is provisioned according to the ratio of the types of the storage devices. In some embodiments, the storage volume 178 comprises a logical volume comprising one or more first storage devices of a first type and one or more second storage devices of a second type, different from the first type, and the storage volume 178 is provided to the computing client device 170 over a network 140.

In some embodiments, the method 400 further includes adjusting one or more of a deduplication setting, a cache setting, or a compression setting of the storage volume based on the one or more parameters 144. The method 400 may also include adjusting a number of processing units (e.g., processor(s) 172) allocated to the computing client device and an amount of memory 174 allocated to the computing client device 170 based on one or more of the deduplication setting, the cache setting, or the compression setting of the storage volume 178.

Figure 5:
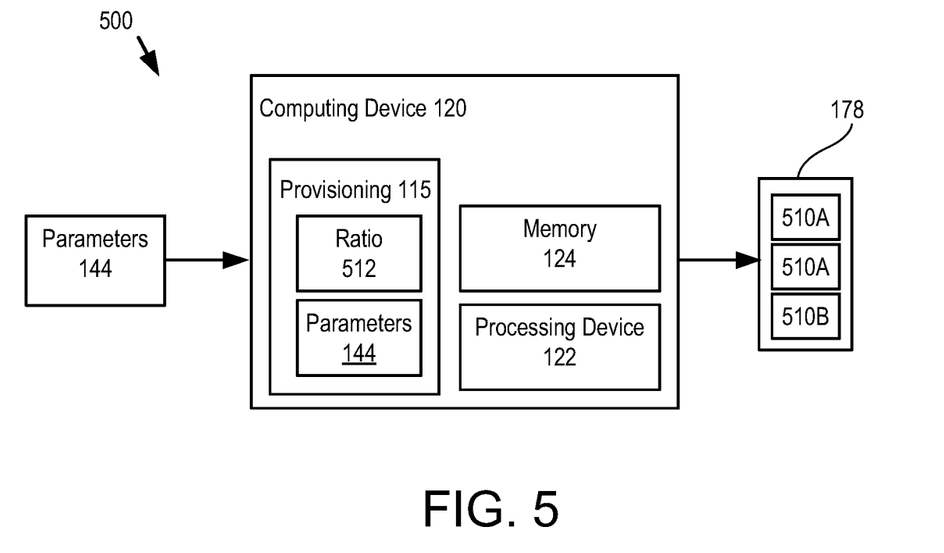
FIG. 5 is a component diagram of an example of a device architecture, in accordance with embodiments of the disclosure.

FIG. 5 is a component diagram of an example of a device architecture 500, in accordance with embodiments of the disclosure. The device architecture 500 includes computing device 120 having processing device 122 and memory 124, as described herein with respect to FIGS. 1 and 3.

The computing device 120 may receive a plurality of parameters 144. The plurality of parameters 144 may correspond to a targeted energy characteristic of a computing client device 170. The computing device 120 (e.g., through operation of processing device 122) may adjust a ratio 512 of types 510A, 510B of storage devices 510 allocated to a storage volume 178 for the computing client device 170 based on the one or more parameters 144, as described herein with respect to FIGS. 1 to 4. The storage devices 510 may have a first type 510A (e.g., HDD) and a second type 510B (e.g., SSD) that are different from one another, as described herein with respect to FIGS. 1 to 4. A storage volume 178 for the computing client device 170 may be provisioned according to the ratio 512 of the types 510A, 510B of the storage devices 510, as described herein with respect to FIGS. 1 to 4.

The device architecture 500 of FIG. 5 provides a technological capability to dynamically configure a computing client device 170 to match energy goals of a user and/or administrator, as reflected by the one or more parameters 144 provided to the computing device 120. In some embodiments, the ratio 512 of the storage devices 510 may allow the energy expenditure and/or carbon footprint of the storage volume 178 to be more precisely adjusted by mixing the types 510A, 510B of the storage devices 510 used for the storage volume 178.

Figure 6:
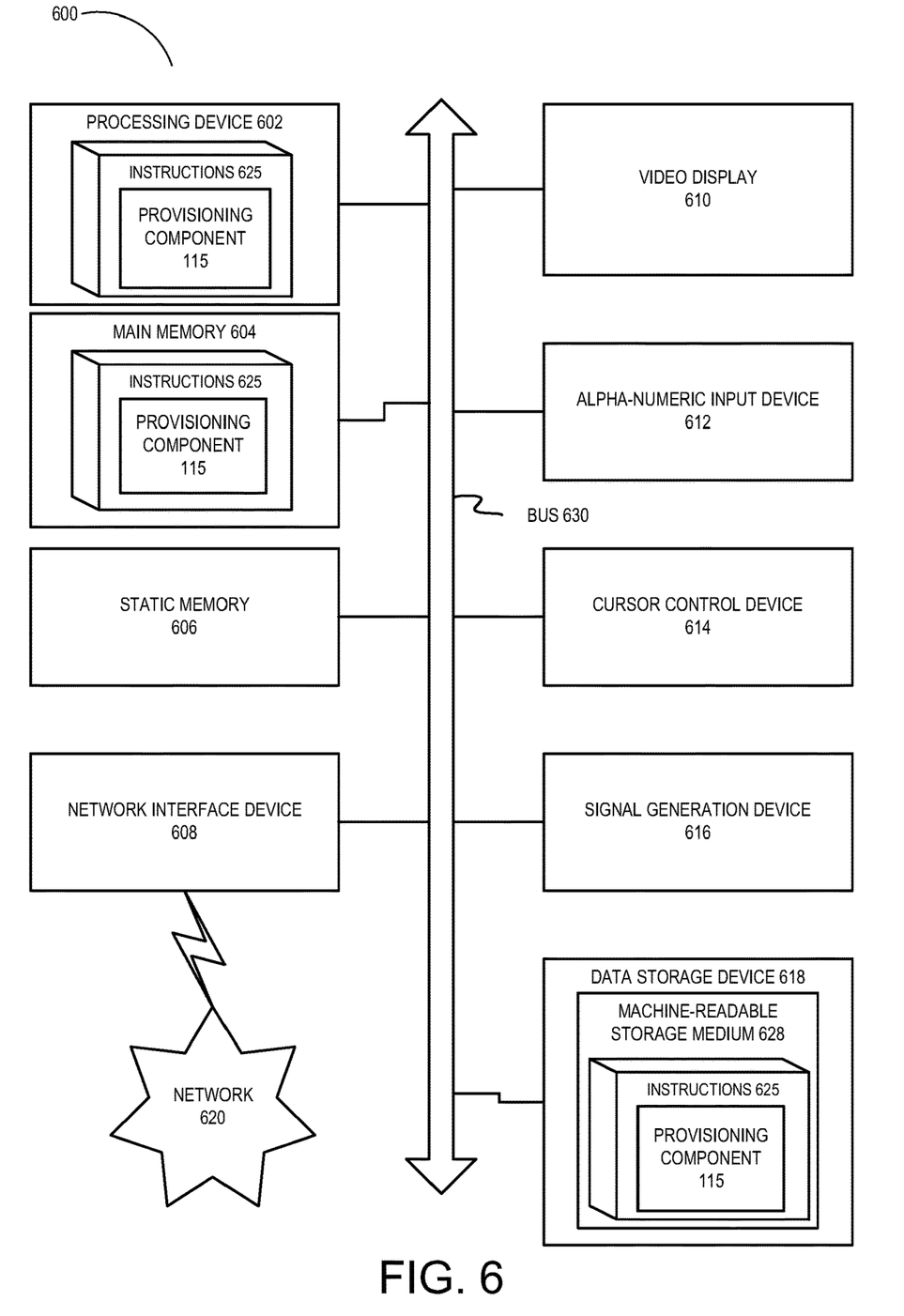
FIG. 6 is a block diagram that illustrates an example system, according to some embodiments of the present disclosure.

FIG. 6 is a block diagram of an example computing device 600 that may perform one or more of the operations described herein, in accordance with some embodiments of the disclosure. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), network processor, or the like. The processing device 602 may execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a component (e.g., provisioning component 115, compute provisioning engine 150, and/or storage provisioning engine 160 discussed herein) for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "adjusting," "provisioning," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combination of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
receiving one or more parameters corresponding to a targeted energy characteristic of a cloud computing client device;
determining, by a processing device, a ratio of types of storage devices, an initial quantity of processors, and an initial quantity of memory to provision to the cloud computing client device based on the one or more parameters corresponding to the targeted energy characteristic of the cloud computing client device;
generating a configuration file for the cloud computing client device, the configuration file including the ratio of the types of storage devices, the initial quantity of processors, and the initial quantity of memory;
determining a an encryption setting based on the one or more parameters corresponding to the target energy characteristic of the cloud computing client device;
determining a data service associated with the encryption setting;
adjusting the initial quantity of processors and the initial quantity of memory in the configuration file based on the encryption setting and the data service associated with the encryption setting to determine a modified quantity of processors and a modified quantity of memory in the configuration file to provision to the cloud computing client device; and
provisioning a storage volume, processors, and memory for the cloud computing client device based on the configuration file, the storage volume provisioned according to the ratio of the types of the storage devices in the configuration file, the processors provisioned according to the modified quantity of processors in the configuration file, and the memory provisioned according to the modified quantity of memory in the configuration file.

2. The method of claim 1, wherein the types of the storage devices comprise hard disk drives (HDDs) and solid state drives (SSDs).

3. The method of claim 1, further comprising adjusting at least one of a deduplication setting, a cache setting, or a compression setting of the storage volume based on the one or more parameters.

4. The method of claim 3, further comprising:
adjusting, by the processing device, the processors and the memory provisioned to the cloud computing client device based on at least one of the deduplication setting, the cache setting, or the compression setting of the storage volume.

5. The method of claim 1, wherein the one or more of the parameters comprise an energy characteristic, a performance characteristic, a cost characteristic, a capacity characteristic, a location characteristic, or a reliability characteristic.

6. The method of claim 1, wherein the storage volume comprises a logical volume comprising one or more first storage devices of a first type and one or more second storage devices of a second type, different from the first type, the storage volume is provided to the cloud computing client device over a network via a storage server, and the storage volume is managed atomically with the cloud computing client device.

7. The method of claim 1, wherein the cloud computing client device comprises a software container or a virtual machine.

8. A system comprising:
a memory; and
a processing device, operatively coupled to the memory, to:
receive one or more parameters corresponding to a targeted energy characteristic of a cloud computing client device;
determine a ratio of types of storage devices, an initial quantity of processors, and an initial quantity of memory to provision to the cloud computing client device based on the one or more parameters corresponding to the targeted energy characteristic of the cloud computing client device;
generate a configuration file for the cloud computing client device, the configuration file including the ratio of the types of storage devices, the initial quantity of processors, and the initial quantity of memory;
determine a an encryption setting based on the one or more parameters corresponding to the target energy characteristic of the cloud computing client device;
determine a data service associated with the encryption setting;
adjust the initial quantity of processors and the initial quantity of memory in the configuration file based on the encryption setting and the data service associated with by the encryption setting to determine a modified quantity of processors and a modified quantity of memory in the configuration file to provision to the cloud computing client device; and
provision a storage volume, processors, and memory for the cloud computing client device based on the configuration file, the storage volume provisioned according to the ratio of the types of the storage devices in the configuration file, the processors provisioned according to the modified quantity of processors in the configuration file, and the memory provisioned according to the modified quantity of memory in the configuration file.

9. The system of claim 8, wherein the types of the storage devices comprise hard disk drives (HDDs) and solid state drives (SSDs).

10. The system of claim 8, wherein the processing device is further to adjust at least one of a deduplication setting, a cache setting, or a compression setting of the storage volume based on the one or more parameters.

11. The system of claim 10, wherein the processing device is further to: adjust the processors and the memory provisioned to the cloud computing client device based on at least one of the deduplication setting, the cache setting, or the compression setting of the storage volume.

12. The system of claim 8, wherein the one or more of the parameters comprise an energy characteristic, a performance characteristic, a cost characteristic, a capacity characteristic, a location characteristic, or a reliability characteristic.

13. The system of claim 8, wherein the storage volume comprises a logical volume comprising one or more first storage devices of a first type and one or more second storage devices of a second type, different from the first type, the storage volume is provided to the cloud computing client device over a network via a storage server, and the storage volume is managed atomically with the cloud computing client device.

14. The system of claim 8, wherein the cloud computing client device comprises a software container or a virtual machine.

15. A non-transitory computer-readable storage medium including instructions that, when executed by a processing device, cause the processing device to:

receive one or more parameters corresponding to a targeted energy characteristic of a cloud computing client device;

determine a ratio of types of storage devices, an initial quantity of processors, and an initial quantity of memory to provision to the cloud computing client device based on the one or more parameters corresponding to the targeted energy characteristic of the cloud computing client device;

generate a configuration file for the cloud computing client device, the configuration file including the ratio of the types of storage devices, the initial quantity of processors, and the initial quantity of memory;

determine a an encryption setting based on the one or more parameters corresponding to the target energy characteristic of the cloud computing client device;

determine a data service associated with the encryption setting;

adjust the initial quantity of processors and the initial quantity of memory in the configuration file based on the encryption setting and the data service associated with the encryption setting to determine a modified quantity of processors and a modified quantity of memory in the configuration file to provision to the cloud computing client device; and provision a storage volume, processors, and memory for the cloud computing client device based on the configuration file, the storage volume provisioned according to the ratio of the types of the storage devices in the configuration file, the processors provisioned according to the modified quantity of processors in the configuration file, and the memory provisioned according to the modified quantity of memory in the configuration file.

16. The non-transitory computer-readable storage medium of claim 15, wherein the types of the storage devices comprise hard disk drives (HDDs) and solid state drives (SSDs).

17. The non-transitory computer-readable storage medium of claim 15, wherein the processing device is further to adjust at least one of a deduplication setting, a cache setting, or a compression setting of the storage volume based on the one or more parameters.

18. The non-transitory computer-readable storage medium of claim 17, wherein the processing device is further to:

adjust the processors and the memory provisioned to the cloud computing client device based on at least one of the deduplication setting, the cache setting, or the compression setting of the storage volume.

19. The non-transitory computer-readable storage medium of claim 15, wherein the one or more of the parameters comprise an energy characteristic, a performance characteristic, a cost characteristic, a capacity characteristic, a location characteristic, or a reliability characteristic.

20. The non-transitory computer-readable storage medium of claim 15, wherein the storage volume comprises a logical volume comprising one or more first storage devices of a first type and one or more second storage devices of a second type, different from the first type, the storage volume is provided to the cloud computing client device over a network via a storage server, and the storage volume is managed atomically with the cloud computing client device.

* * * * *